(12) United States Patent
Lothe et al.

(10) Patent No.: US 12,385,759 B2
(45) Date of Patent: Aug. 12, 2025

(54) COMPLETING FEATURE-BASED LOCALIZATION MAPS

(71) Applicant: Robert Bosch GmbH, Stuttgart (DE)

(72) Inventors: Pierre Lothe, Hildesheim (DE); Erik Einhorn, Sarstedt (DE); Hanno Homann, Hannover (DE); Julian Lindner, Hannover (DE); Maurice Seer, Elze (DE); Moritz Michael Knorr, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 289 days.

(21) Appl. No.: 17/883,889

(22) Filed: Aug. 9, 2022

(65) Prior Publication Data

US 2023/0050662 A1 Feb. 16, 2023

(30) Foreign Application Priority Data

Aug. 12, 2021 (DE) ...................... 10 2021 208 832.5

(51) Int. Cl.
*G01C 21/00* (2006.01)
*G01C 21/26* (2006.01)
(Continued)

(52) U.S. Cl.
CPC ..... *G01C 21/3859* (2020.08); *G01C 21/3804* (2020.08); *G01C 21/3848* (2020.08);
(Continued)

(58) Field of Classification Search
CPC ............ G01C 21/3859; G01C 21/3804; G01C 21/3848; G01C 21/26; G01C 21/28;
(Continued)

(56) References Cited

U.S. PATENT DOCUMENTS

| 2017/0030722 A1* | 2/2017 | Kojo | ........................ F16H 59/44 |
| 2019/0050648 A1* | 2/2019 | Stojanovic | ............. G06V 20/13 |
| 2022/0214186 A1* | 7/2022 | Bagheri | ................. G06F 18/253 |

FOREIGN PATENT DOCUMENTS

| DE | 102017217065 A1 | 3/2019 |
| DE | 102019209117 A1 | 12/2020 |

(Continued)

OTHER PUBLICATIONS

Road Mapping and Localization using Sparse Semantic Visual Features (Year: 2021).*
(Continued)

*Primary Examiner* — Ramon A. Mercado
*Assistant Examiner* — Tyler Roger Robarge
(74) *Attorney, Agent, or Firm* — NORTON ROSE FULBRIGHT US LLP

(57) ABSTRACT

A method is provided for creating at least one map of vehicle surroundings with the aid of a control unit. It is checked based on a comparison between received measured data and stored or received map data, whether first features, for example semantic features, are present and complete. First features available in a vehicle surroundings are extracted from the received measured data if no or incomplete map data are present. It is checked whether a localization is possible within the vehicle surroundings with the aid of the first semantic features. If a localization is imprecise or not possible with the aid of the ascertained first features, second features are extracted from the received measured data. A digital map of vehicle surroundings is created based on the ascertained first features and/or the second features. Furthermore, a control unit, a computer program as well as a machine-readable memory medium are provided.

4 Claims, 2 Drawing Sheets

(51) Int. Cl.
  *G01C 21/28* (2006.01)
  *G01C 21/30* (2006.01)
  *G01C 21/32* (2006.01)

(52) U.S. Cl.
  CPC ............. *G01C 21/26* (2013.01); *G01C 21/28* (2013.01); *G01C 21/30* (2013.01); *G01C 21/32* (2013.01)

(58) Field of Classification Search
  CPC ........ G01C 21/30; G01C 21/32; G01C 21/38; G01S 17/89; G05D 1/0274
  See application file for complete search history.

(56) References Cited

FOREIGN PATENT DOCUMENTS

| DE | 102020200154 A1 | 7/2021 | |
| WO | WO-2020113425 A1 * | 6/2020 | ......... G01C 21/3848 |
| WO | WO-2020224761 A1 * | 11/2020 | ............. G01C 21/32 |

OTHER PUBLICATIONS

Semantic Point Cloud Mapping of LiDAR Based on Probabilistic Uncertainty Modeling for Autonomous Driving (Year: 2020).*
Generation of a Precise Roadway Map for Autonomous Cars (Year: 2013).*
An approach for feature semantics recognition in geometric models (Year: 2004).*
Construction process of a three-dimensional roadway geometry map for autonomous driving (Year: 2017).*
Cheng, W., Yang, S., Zhou, M., Liu, Z., Chen, Y., & Li, M. (2021). Road mapping and localization using sparse semantic visual features. IEEE robotics and automation letters, 6(4), 8118-8125. (Year: 2021).*
K. Jo and M. Sunwoo, "Generation of a Precise Roadway Map for Autonomous Cars," in IEEE Transactions on Intelligent Transportation Systems, vol. 15, No. 3, pp. 925-937, Jun. 2014, doi: 10.1109/TITS.2013.2291395 (Year: 2014).*

* cited by examiner

COMPLETING FEATURE-BASED LOCALIZATION MAPS

CROSS REFERENCE

The present application claims the benefit under 35 U.S.C. § 119 of German Patent Application No. DE 10 2021 208 832.5 filed on Aug. 12, 2021, which is expressly incorporated herein by reference in its entirety.

FIELD

The present invention relates to a method for creating at least one map of vehicle surroundings. Furthermore, the present invention relates to a control unit, a computer program as well as a machine-readable memory medium.

BACKGROUND INFORMATION

Vehicles operated in an automated manner require a localization within map data to travel a planned trajectory. In addition to the GNSS-based localization, feature-based localization based on landmarks or features in the vehicle surroundings is usually also used to determine the position of the vehicle.

Various methods for creating feature-based maps are already available. They are oftentimes based on semantic features, such as for example roadway markings, traffic signs, roadway boundaries, buildings, and the like that are extracted from the measured data of the vehicle surroundings. Semantic features of this type may be stored requiring little memory space. In rural areas or on highways, there is however the risk that an insufficient number of distinguishable semantic features may be ascertained. A minimal density of features is, however, needed for a reliable localization.

Furthermore, the extraction of geometric features, such as for example points or lines, is conventional. Features of this type require, however, a lot of memory space and may only be transferred to a limited extent via wireless communication links for the purpose of map creation.

SUMMARY

An object underlying the present invention may be seen in providing a method for creating reliable localization maps requiring minimal memory space.

This object is achieved with the aid of the present invention. Advantageous embodiments of the present invention are disclosed herein.

According to one aspect of the present invention, a method for creating at least one map of vehicle surroundings with the aid of a control unit is provided.

According to an example embodiment of the present invention, in one step, it is checked based on a comparison between received measured data and stored or received map data, whether first features, for example semantic features, are present and complete. It may thus be necessary to update existing map data or to create a new map in the form of new map data. If, for example, no first features are stored in the map data, a need may arise for an update or a creation of map data.

In a vehicle surroundings, first available features are extracted from the received measured data, if no or incomplete map data are present, it being checked whether a localization is possible within the vehicle surroundings with the aid of the first semantic features. For this purpose, measured data from LIDAR sensors, camera sensors, radar sensors, ultrasonic sensors, and the like may for example be referenced to extract features and use them for map creation. It is checked, whether the extracted features are sufficient to implement a localization in the corresponding vehicle surroundings. A minimal number of distinguishable features may, for example, be necessary to be able to implement a reliable localization.

If a localization is imprecise or not possible with the aid of the ascertained first features, second features are extracted from the received measured data. The second features are used in particular to complete or complement the first features.

The second features may be used to fill gaps in the first features with or without a sectional overlap.

Subsequently, a digital map of vehicle surroundings is created based on the ascertained first features and/or the ascertained second features.

"First features" are understood to mean in particular features of a first type and "second features" are understood to mean features of a second type. For example, the first features may be designed as semantic features or semantic landscape features and the second features may be designed as geometric features or landscape features.

Moreover, the first features may be ascertained based on the measured data from a first sensor and the second features may be ascertained based on the measured data from a second sensor. The first features may be features ascertained based on radar measured data and the second features may be features ascertained based on camera measured data or LIDAR measured data.

With the aid of the method, a creation of maps may be implemented that is optimized with regard to the required memory space and with regard to their precision. A digital map created in this manner may thus be used for a particularly robust and precise localization.

A map created by the method is no longer designed as a specific map for a particular type of features, but rather includes several different types of features that are selected in an automated manner to enable a comprehensive localization.

According to a further aspect of the present invention, a control unit is provided, the control unit being configured to carry out the method. The control unit may be, for example, a vehicle-internal control unit, a vehicle-external control unit, or a vehicle-external server unit, such as for example a cloud system. The control unit may be connected to a memory unit or include an integrated memory unit to receive the measured data and to store them at least temporarily. Furthermore, the memory unit may be used to store digital maps or map sections.

The measured data may be received by one or multiple vehicle sensors. The measured data may be transferred internally, i.e., via a hard-wired communication link or via a wireless communication link, to the control unit from the vehicle sensors.

According to one aspect of the present invention, a computer program is moreover provided that includes commands that prompt a computer or a control unit to carry out the method according to the present invention, when the computer program is carried out by a computer or a control unit. According to a further aspect of the present invention, a machine-readable memory medium is provided, on which the computer program according to the present invention is stored.

The vehicle, which is usable for ascertaining the measured data, may be operable in this case according to the BASt (Federal Highway Research Institute) standard in an assisted, semi-automated, highly automated and/or fully automated, i.e., driverless, manner.

The vehicle may generally be designed as a mobile unit that is operable according to the BASt (Federal Highway Research Institute) standard in an assisted, semi-automated, highly automated and/or fully automated, i.e., driverless, manner. For example, the mobile unit may be designed as a vehicle, a robot, a drone, a watercraft, a rail vehicle, a robo-taxi, an industrial robot, a commercial vehicle, a bus, an aircraft, a helicopter, and the like.

In one exemplary embodiment of the present invention, if the localization is imprecise or not possible with the aid of the ascertained first features, all available second features or only those second features that are necessary for completing the ascertained map features are extracted from the received measured data. In this way, all possible second features may be ascertained redundantly in parallel to the first features. In a subsequent step, the relevant or necessary second features may be filtered or combined with the first features. Alternatively, it is possible that only second features are ascertained to fill the gaps of the first features. Spatial gaps are in particular filled in the created digital map or digital map section. In particular, a minimal density of features is necessary to enable an efficient localization based on the created digital map. Gaps may thus also involve map areas having an insufficient density of features.

According to a further specific embodiment of the present invention, the digital map is created at least in part based on a fusion of the first features and the second features. As a result of this measure, the second features may be transformed into the first features and vice versa in one processing step to enable a technically easier localization. Alternatively or in addition, the ascertained first features may be defined in the overlapping area by the ascertained second features, for example by averaging.

According to a further exemplary embodiment of the present invention, the first features are created based on the second features and stored in the digital map. This results in a transformation of the second features into the first features to provide a comprehensive map using the first features.

According to a further specific embodiment of the present invention, the first features are ascertained as semantic features or as sensor-specific features of a first vehicle sensor. According to a further exemplary embodiment of the present invention, the second features are ascertained as geometric features or as sensor-specific features of a second sensor. The digital map may thus be created based on a plurality of possible types of features.

According to a further specific embodiment of the present invention, the comparison between the received measured data and the stored map data is carried out based on a statistical method, in particular based on an exceedance of a threshold value of an uncertainty of a localization, based on a number of available semantic features, or based on a repetition of semantic features. The ascertaining of a covariance in a direction in space may thus already be enough to check the sufficient quality of a digital map in this direction in space. The method is, however, not limited to the above-described statistical methods. Any arbitrary statistical methods and algorithms may rather be used to check whether a localization would be possible based on the ascertained features in the digital map at a predefined precision.

In the following, preferred exemplary embodiments of the present invention are elucidated in greater detail with reference to the highly simplified schematic illustrations in the figures.

DETAILED DESCRIPTION OF EXAMPLE EMBODIMENTS

Figure 1:
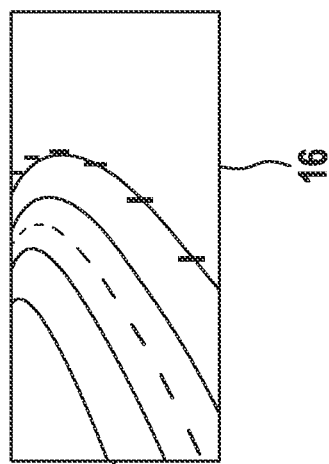
FIG. 1 shows a schematic top view of a vehicle system according to one specific embodiment of the present invention.
Figure 1:
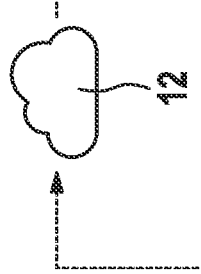
Figure 1:
Figure 1:
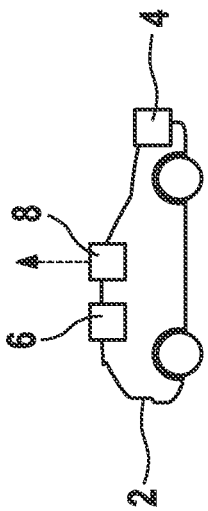
Figure 1:
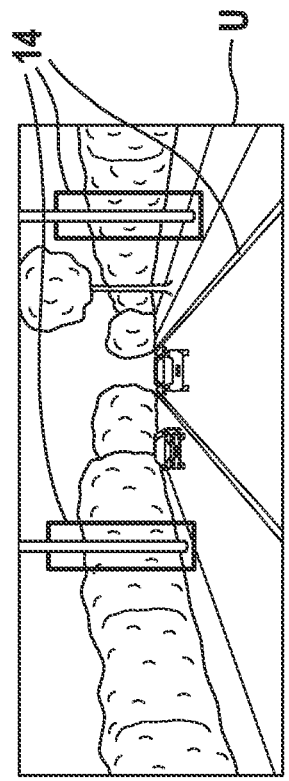

FIG. 1 shows a schematic top view of a vehicle system 1 according to one specific embodiment. Vehicle system 1 includes at least one vehicle 2 including several vehicle sensors 4, 6.

In particular, vehicle 2 includes a first vehicle sensor 4, which is designed as a LIDAR sensor by way of example.

Furthermore, a second vehicle sensor 6 is provided, which is designed as a radar sensor.

Vehicle sensors 4, 6 are used to ascertain measured data by scanning vehicle surroundings U. The collected measured data are received by a vehicle-internal control unit 8.

Control unit 8 may process and, in particular, evaluate the measured data. Moreover, control unit 8 may send the measured data via a wireless communication link 10 to a vehicle-external server unit 12, which is designed as a cloud, for example.

Vehicle-external server unit 12 may process the measured data to extract landscape features or features 14 and use them to create a digital map 16.

Figure 2:
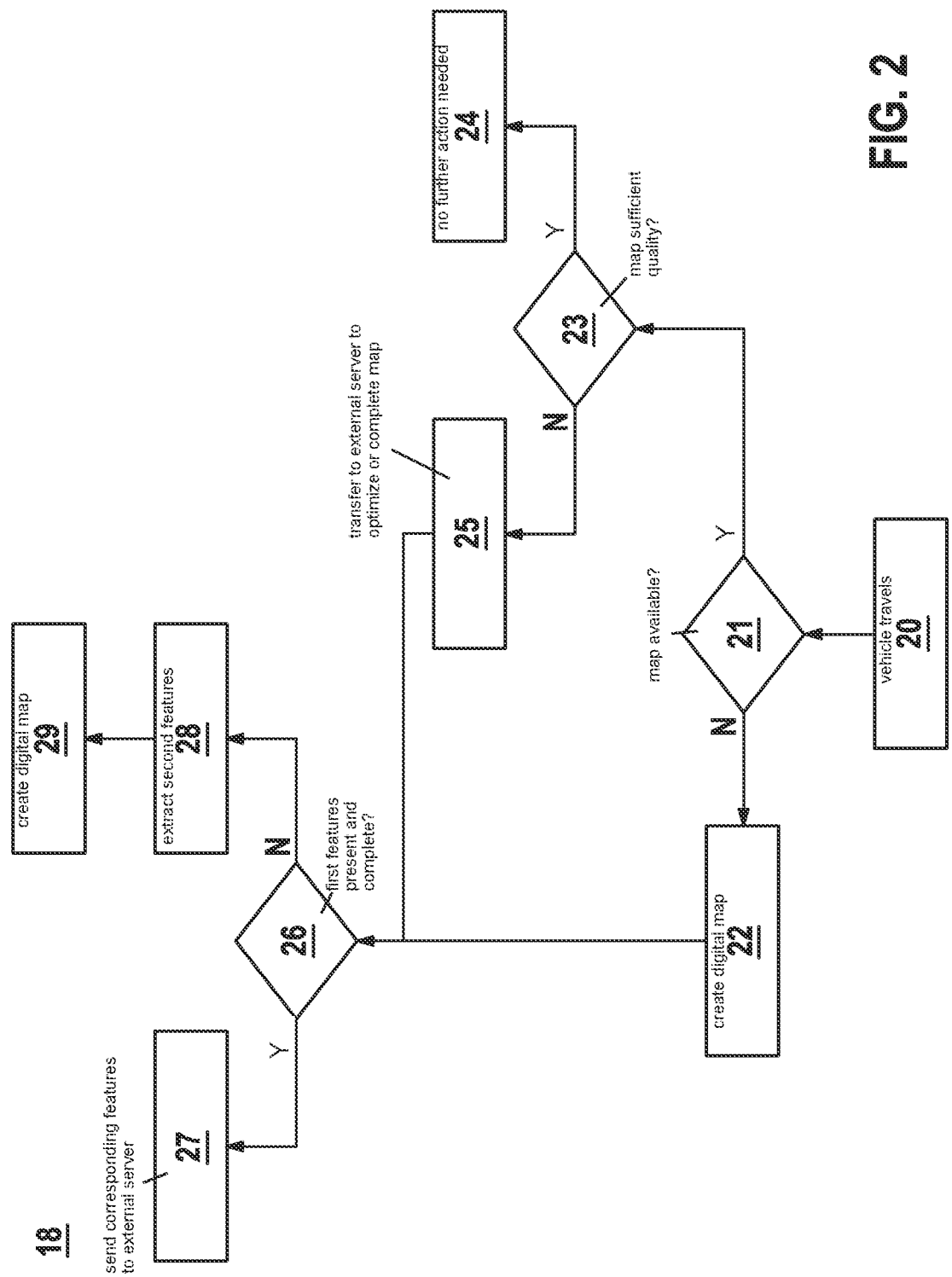
FIG. 2 shows a schematic flowchart for the purpose of illustrating a method according to the present invention according to one specific embodiment.

FIG. 2 shows a schematic flowchart for the purpose of illustrating a method 18 according to the present invention according to one specific embodiment. Method 18 is described based on vehicle system 1 shown in FIG. 1.

Vehicle 2 travels 20 vehicle surroundings U and decides, whether it should transfer the ascertained measured data to external server unit 12. For this purpose, it is checked 21, whether a map is available.

If there is no map available for vehicle surroundings U, a digital map is created 22 by vehicle 2 for this area. This takes place by transferring the measured data to external server unit 12 or by control unit 8 in a vehicle-internal manner that processes the measured data in a digital map section.

If a digital map is available, a check with regard to the quality of this map 23 may be carried out. In the case of a sufficient quality of the available map, no further action 24 is needed, since vehicle 2 is easily able to locate itself within the map.

If the quality of the map is not sufficient for a localization, the measured data of vehicle sensors 4, 6 are transferred to external server unit 12 to optimize or complete 25 the map.

It is checked based on a comparison between received measured data and stored or received map data, whether first features, for example semantic features, are present and complete 26.

First features available in vehicle surroundings U are extracted from the received measured data, if no or incomplete map data are present. It is checked, whether a localization within vehicle surroundings U is possible with the aid of the first semantic features. The corresponding features are sent 27 to external server unit 12, if a localization is possible.

If a localization is imprecise or not possible with the aid of the ascertained first features, second features are extracted 28 from the received measured data. The second features may be, for example, geometric features. Subsequently, a digital map of vehicle surroundings U is created 29 based on the ascertained first features and/or the second features.

Control unit 8 of the vehicle is able to decide whether the second features are additionally ascertained. The first features are prioritized in the illustrated exemplary embodiment, since, as semantic features, they are robust and require little memory space.

What is claimed is:

1. A method for creating a digital map of a vehicle surroundings, the method comprising the following steps:
   driving, by a vehicle, in an environment;
   sensing, by sensors installed in the vehicle, areas in the environment;
   processing, by a processor, signals of the sensors according to programming of the processor, the processing including performing the following for each respective one of a plurality of the areas:
      identifying from the signals sensed for the respective area a first set of features categorized by the processor as being semantic features and a second set of features categorized by the processor as being geometric features;
      determining whether a number of the features categorized as being semantic features of the identified features for the respective area is sufficient to be able to perform a localization based on the features categorized as being semantic features identified for the respective area;
      depending on a result of the determining regarding whether the number is sufficient, selecting whether to (I) perform a first population type that selectively populates a respective region of the digital map that corresponds to the respective area with the semantic features without populating the respective region with the features categorized as being geometric features of the identified features for the respective area or (II) perform a second population type that populates the respective region of the digital map with at least the features categorized as being geometric features of the identified features for the respective area, wherein the determination is to perform the first population type whenever the result is that the number is sufficient and the determination is to perform the second population type whenever the result is that the number is insufficient; and
      populating the respective region of the digital map by performing whichever of the first and second population types has been selected for the respective area in the selecting step;
   wherein a result of the populating is that, for a first one or more of the plurality of areas, the first population type is performed and, for a second one or more of the plurality of areas, the second population type is performed such that one or more of the respective regions of the digital map of the vehicle surroundings (I) is formed of one or more of the semantic features without any of the geometric features and (II) transitions into one or more other of the respective regions that includes one or more of the geometric features.

2. The method as recited in claim 1, further comprising processing one or more of the geometric features to transform the one or more geometric features into one or more semantic features included in the digital map.

3. A system for creating a digital map of a vehicle surroundings, the system comprising:
   a vehicle, wherein the vehicle is configured for driving in an environment;
   sensors installed in the vehicle, wherein the sensors are configured to sense areas in the environment;
   at least one processor, wherein the at least one processor is configured to process signals output by the sensors according to programming of the at least one processor, the processing including performing the following for each respective one of a plurality of the areas:
      identifying from the signals sensed for the respective area a first set of features categorized by the processor as being semantic features and a second set of features categorized by the processor as being geometric features;
      determining whether a number of the features categorized as being semantic features of the identified features for the respective area is sufficient to be able to perform a localization based on the features categorized as being semantic features identified for the respective area;
      depending on a result of the determining regarding whether the number is sufficient, selecting whether to (I) perform a first population type that selectively populates a respective region of the digital map that corresponds to the respective area with the semantic features without populating the respective region with the features categorized as being geometric features of the identified features for the respective area or (II) perform a second population type that populates the respective region of the digital map with at least the features categorized as being geometric features of the identified features for the respective area, wherein the determination is to perform the first population type whenever the result is that the number is sufficient and the determination is to perform the second population type whenever the result is that the number is insufficient; and
      populating the respective region of the digital map by performing whichever of the first and second population types has been selected for the respective area in the selecting step;
   wherein a result of the populating is that, for a first one or more of the plurality of areas, the first population type is performed and, for a second one or more of the plurality of areas, the second population type is performed such that one or more of the respective regions of the digital map of the vehicle surroundings (I) is formed of one or more of the semantic features without any of the geometric features and (II) transitions into one or more other of the respective regions that includes one or more of the geometric features.

4. A non-transitory machine-readable memory medium on which is stored a computer program for creating a digital map of a vehicle surroundings, the computer program being executable by a computer and, when executed by the computer, causing the computer to perform the following steps:
   during a drive of a vehicle in an environment, in which drive sensors installed in the vehicle sense areas in the environment, the computer processing signals of the sensors according to the computer program, the processing including performing the following for each of a plurality of the areas:
      identifying from the signals sensed for the respective area a first set of features categorized by the processor as being semantic features and a second set of features categorized by the processor as being geometric features;
      determining whether a number of the features categorized as being semantic features of the identified features for the respective area is sufficient to be able to perform a localization based on the features categorized as being semantic features identified for the respective area;

depending on a result of the determining regarding whether the number is sufficient, selecting whether to (I) perform a first population type that selectively populates a respective region of the digital map that corresponds to the respective area with the semantic features without populating the respective region with the features categorized as being geometric features of the identified features for the respective area or (II) perform a second population type that populates the respective region of the digital map with at least the features categorized as being geometric features of the identified features for the respective area, wherein the determination is to perform the first population type whenever the result is that the number is sufficient and the determination is to perform the second population type whenever the result is that the number is insufficient; and populating the respective region of the digital map by performing whichever of the first and second population types has been selected for the respective area in the selecting step;

wherein a result of the populating is that, for a first one or more of the plurality of areas, the first population type is performed and, for a second one or more of the plurality of areas, the second population type is performed such that one or more of the respective regions of the digital map of the vehicle surroundings (I) is formed of one or more of the semantic features without any of the geometric features and (II) transitions into one or more other of the respective regions that includes one or more of the geometric features.

* * * * *